(12) United States Patent
Trezza et al.

(10) Patent No.: US 6,453,081 B1
(45) Date of Patent: Sep. 17, 2002

(54) OPTOELECTRONIC DEVICE WITH INTEGRATED PASSIVE OPTICAL ELEMENTS AND METHOD

(75) Inventors: John A. Trezza, Nashua, NH (US); Glenn R. Thoren, Chelmsford, MA (US)

(73) Assignee: Teraconnect, Inc., Nashua, NH (US)

( * ) Notice: Subject to any disclaimer, the term of this patent is extended or adjusted under 35 U.S.C. 154(b) by 0 days.

(21) Appl. No.: 09/693,244

(22) Filed: Oct. 20, 2000

Related U.S. Application Data

(60) Provisional application No. 60/161,172, filed on Oct. 22, 1999.

(51) Int. Cl.[7] .................................................. G02B 6/12
(52) U.S. Cl. .......................... 385/14; 385/33; 385/36; 385/88; 385/93; 385/52
(58) Field of Search ........................ 385/14, 16, 88–94, 385/42–46, 33–35; 359/245, 248, 152, 247, 143, 154, 189, 188, 195; 250/227.24, 227.11; 257/80, 84, 435

(56) References Cited

U.S. PATENT DOCUMENTS

| | | | |
|---|---|---|---|
| 5,337,398 A | * | 8/1994 | Benzoni et al. ............... 385/90 |
| 5,659,637 A | | 8/1997 | Bagley, Jr. et al. |
| 5,671,243 A | | 9/1997 | Yap |
| 5,677,778 A | | 10/1997 | Kanterakis et al. |
| 5,761,350 A | | 6/1998 | Koh |
| 5,923,796 A | | 7/1999 | Feldman et al. |
| 6,052,498 A | | 4/2000 | Paniccia |
| 6,061,481 A | | 5/2000 | Heidrich et al. |
| 6,097,521 A | | 8/2000 | Althaus |
| 6,097,857 A | * | 8/2000 | Feldman ........................ 385/14 |

OTHER PUBLICATIONS

PCT International Search Report dated Apr. 4, 2001 of International Application No. PCT/US00/41331 filed Oct. 20, 2001.
M. Ajmone Marsan et al, Modelling Slotted Multi–Channel Ring All–Optical Networks, *IEEE*, 1997, pp. 146–153.
Marco Ajmone Marsan et al, Access Protocols for Photonic WDM Multi–Rings with Tunable Transmitters and Fixed Receivers, *SPIE*, pp. 59–72, vol. 26921.
Carl Beckmann, Applications: Asynchronous Transfer Mode and Synchronous Optical Network, *Handbook of Fiber Optic Data Communication*, 1998, pp. 385–414, Academic Press.
Floyd E. Ross, An Overview of FDDI: The Fiber Distributed Data Interface, *IEEE Journal on Selected Areas in Communications*, Sep. 1989, pp. 1043–1051, vol. 7, No. 7.

* cited by examiner

*Primary Examiner*—Phan T. H. Palmer
(74) *Attorney, Agent, or Firm*—Scott J. Asmus; Vernon C. Maine; Maine & Asmus

(57) ABSTRACT

An optoelectronic device with an array of passive optical elements mounted thereon which provide optical communications between the active optical elements of the transceiver array as well as optical signal processing.

21 Claims, 5 Drawing Sheets

OPTOELECTRONIC DEVICE WITH INTEGRATED PASSIVE OPTICAL ELEMENTS AND METHOD

RELATED APPLICATIONS

This application is based on Provisional Patent Application Serial No. 60/161,172 filed Oct. 22, 1999.

FIELD OF THE INVENTION

This invention relates to optical communication systems and more particularly to an optoelectronic device with optical elements integrated thereon.

BACKGROUND OF INVENTION

Optical couplers are now used to communicate optical signals over short and long distances between, for example, two computers, two circuit boards in one computer, and even two different chips on the same circuit board.

As integrated device technology continues to place more circuitry and photonic devices on a single wafer or chip, it becomes possible to build complete systems on a single wafer or chip. For these devices to be the most efficient, optical communication needs to occur between the individual photonic devices.

Present structures for optical communication between two chips on the same circuit board utilize short optical fiber or couplers between the chips. However, these devices have limited capability with respect to the number of such communication links due to the size of the connecting devices. This problem is even worse for optical communications between separate photonic devices on the same chip.

SUMMARY OF THE INVENTION

It is therefore an object of this invention to provide an optoelectronic device with optical communication between different photonic devices on the optoelectronic device.

It is a further object of this invention to provide an optoelectronic device with passive optical elements integrated thereon that provide communications and processing of the optical signal.

It is a further object of this invention to provide a method for making an optoelectronic device with passive optical elements integrated thereon.

This invention results from the realization that a more efficient optoelectronic device is achieved by optically coupling data from one area of a chip to another area of the same chip.

The present invention provides an optoelectronic device including a substrate with transceiver circuitry; a transceiver array, including a plurality of photonic devices, attached to the substrate and in electrical communication with the transceiver circuitry; and a plurality of passive optical components attached to the transceiver array, the passive optical elements optically connecting at least two of the photonic devices to each other. The substrate may be silicon or other suitable material. The photonic devices may be transmitters and receivers and may be located individually or interdigitated. The passive optical elements may also provide optical signal processing.

This invention further provides an optoelectronic device including a substrate with transceiver circuitry; a transceiver array with a plurality of photonic devices; a plurality of passive optical element modules, each passive optical element module including a plurality of passive optical elements attached to the transceiver array to optically connect at least two of the photonic devices to each other. The substrate may be silicon or other suitable material.

This invention further provides a method for making an optoelectronic device with an integrated array of passive optical elements by mounting an array of passive optical elements on a substrate and flip-chip bonding the array of optical elements to a substrate containing driver and receiver circuitry and an array of active optical elements.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
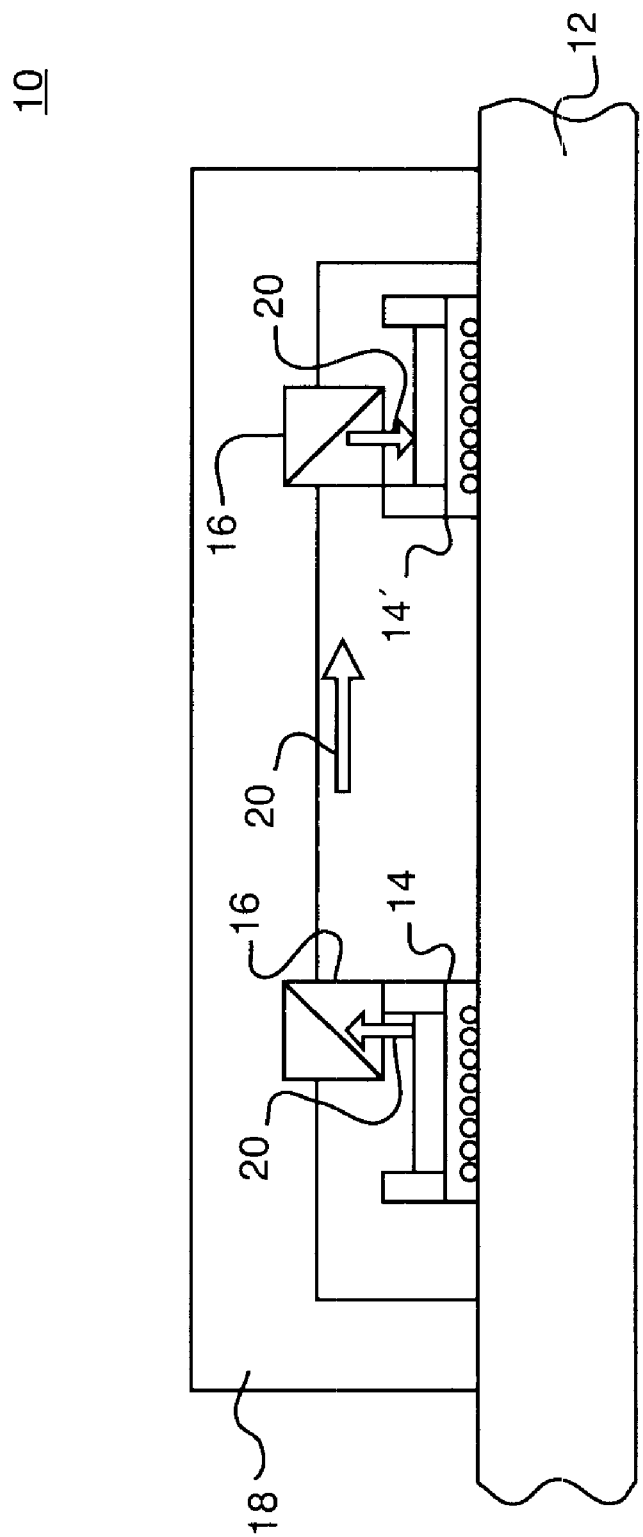
FIG. 1 is schematic view of an optoelectronic device with integrated optical elements according to this invention.

An optoelectronic device 10 according to the present invention is shown in FIG. 1. Circuit board 12 has mounted thereon transceiver arrays 14 and 14'. Transceiver arrays 14 include a plurality of photonic devices. These devices may be transmitters, such as Vertical Cavity Surface Emitting Lasers (VCSELs), or other light emitting photonic devices and receivers, such as p-i-n diodes or other light receiving photonic devices.

An array of passive optical elements 16, attached to mold 18, is bonded to circuit board 12. As shown in FIG. 1, the path of the optical transmission is indicated by arrows 20. The light is transmitted from one transceiver array 14 to another transceiver array 14' through the positioning of passive optical elements 16.

Figure 2:
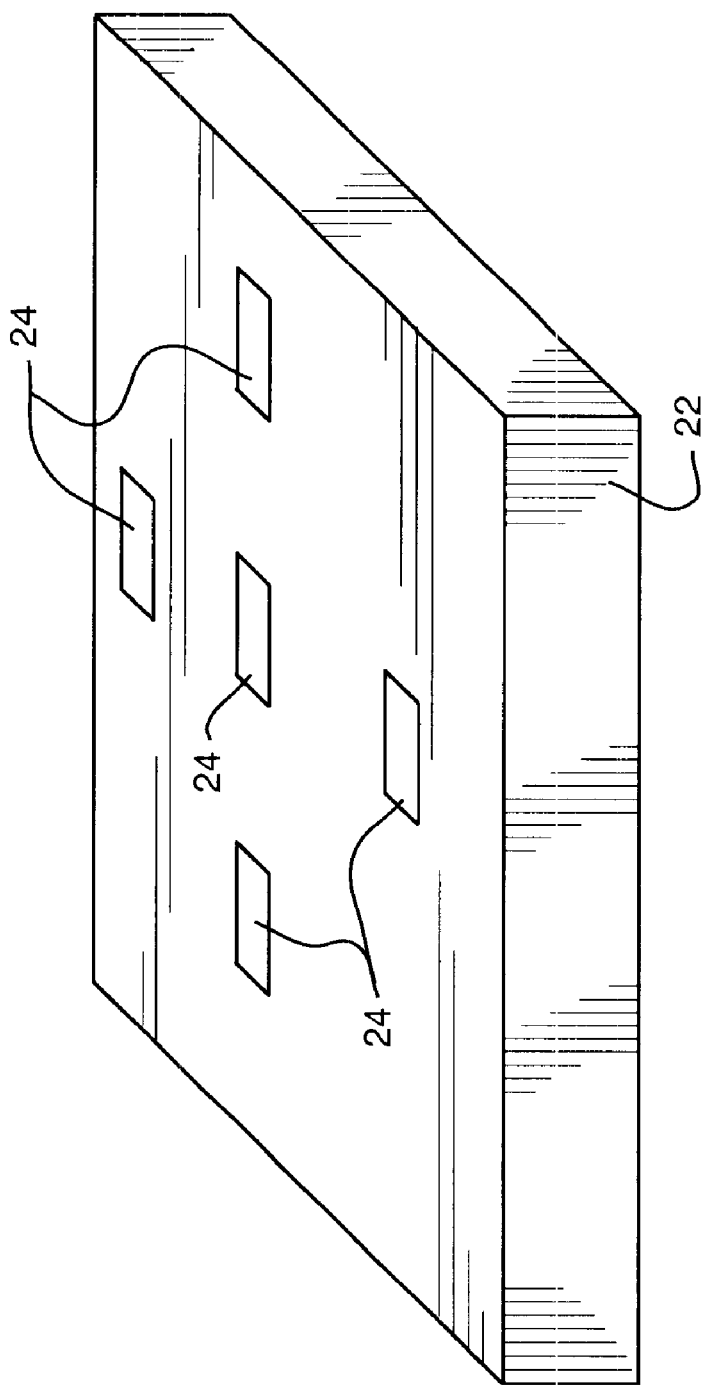
FIG. 2 is perspective view of a mold used for flip-chip mounting optical elements to a transceiver array.

FIG. 2 shows a mold 22 to which passive optical elements may be attached. Mold 22 is formed of a material which provides a sufficiently rigid structure for upon which to mount the passive optical elements. Slots 24 are provided on mold 22 for positioning a plurality of passive optical elements in a desired pattern. An array of passive optical elements may be designed using techniques such as those described *Optics, 3$^{rd}$ Edition,* E. Hecht & K. Guardino, eds., (Addison Wesley Longman, Inc. 1997). In addition, commercial software packages are available to design such optical arrays, providing for optimization and efficiency of design.

Alternatively, the supporting structure for the passive optical elements can be milled, manufactured or etched out of a suitable material, such as glass, quartz, epoxy, diamond thin films, sapphire or other dielectric materials.

Figure 3:
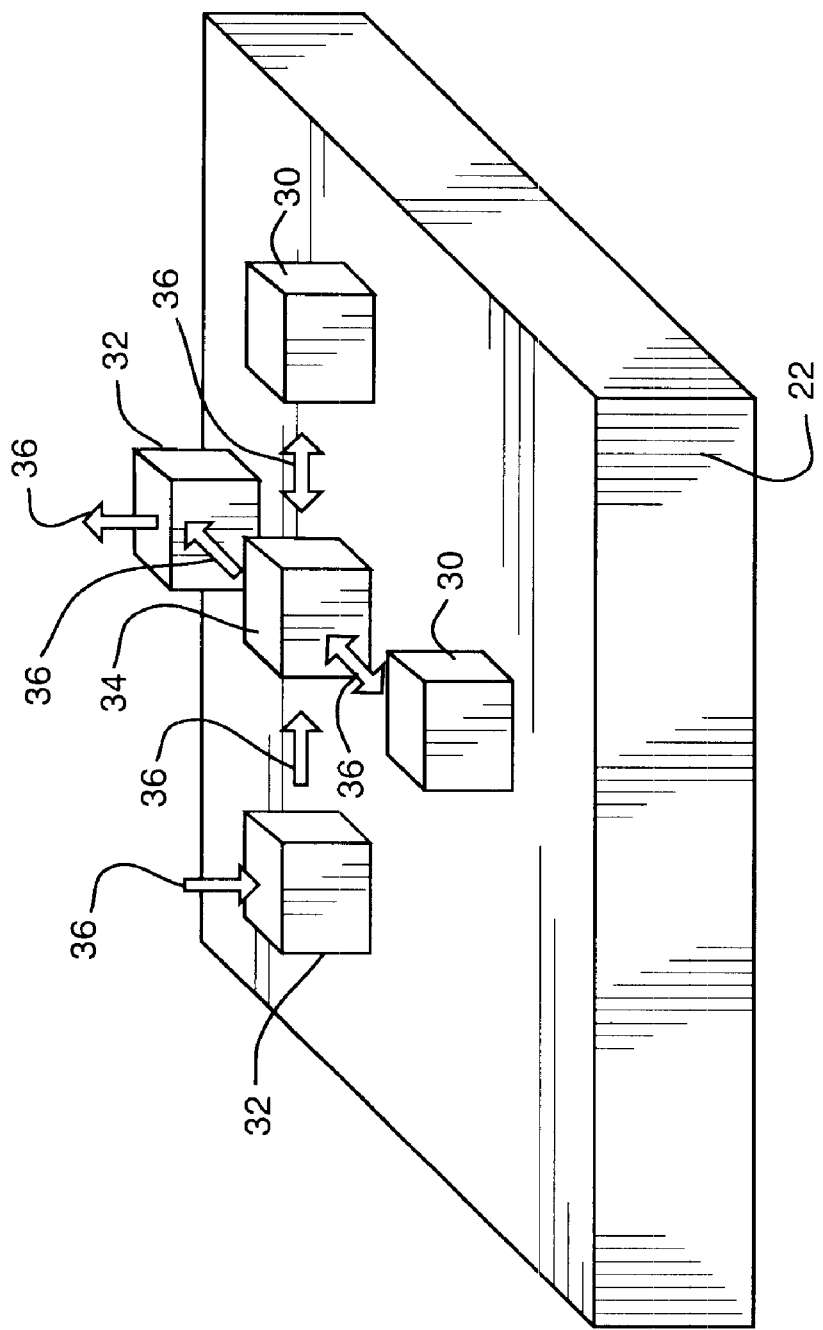
FIG. 3 is a perspective view of the mold of FIG. 4 with representative optical elements attached thereto.

An example of an array of passive optical elements is shown in FIG. 3. Mold 22 has passive optical elements 30, 32 and 34 attached thereto. In this example, elements 30 and 32 are mirrors and element 34 is a beam splitter. Arrows 36 indicate the path of the light. This array of passive optical elements functions as an interferometer.

Once the array of passive optical elements is mounted on the mold, the array is flip-chip bonded to the transceiver array. This process of flip-chip bonding is described in U.S. Pat. No. 6,005,262, incorporated herein by reference.

An example of the combined assembly is shown in FIG. 1. For simplicity, only two passive optical elements 16 are shown. In general, there would be more passive optical elements, such as those shown in FIG. 3.

Figure 4:
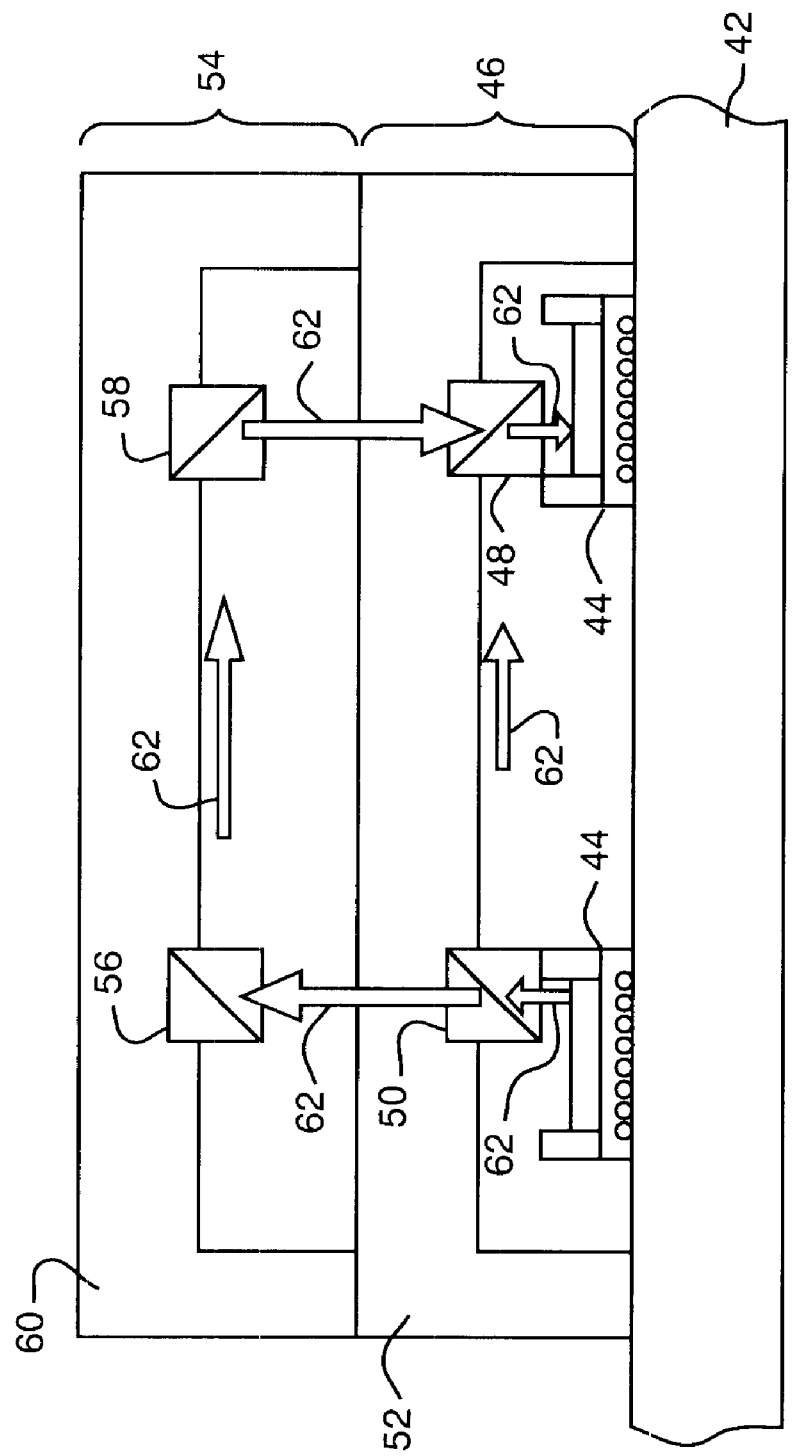
FIG. 4 is a schematic view of an optoelectronic device with integrated optical elements attached thereto in modules, according to another aspect of this invention.

In another embodiment of this invention, a plurality of modules each containing a plurality of passive optical elements may be stacked onto one silicon substrate/transceiver array assembly. As shown in FIG. 4, module 46 is flip-chip mounted to silicon substrate 42 and module 54 is flip-chip mounted to module 46. Module 46 includes passive optical elements 48 and 50 that are mounted on mold 52. Module 54 includes passive optical elements 56 and 58 mounted to mold 60. Circuit board 42 includes transceiver arrays 44 and 44'. The path of light is indicated by arrows 62, which show that light is transmitted from transceiver array 44 to transceiver array 44' through module 46 as well as through the combination of modules 46 and 54. By using modular construction such as this, a wider variety of combinations of passive optical elements may be utilized for communication and optical signal processing.

Figure 5:
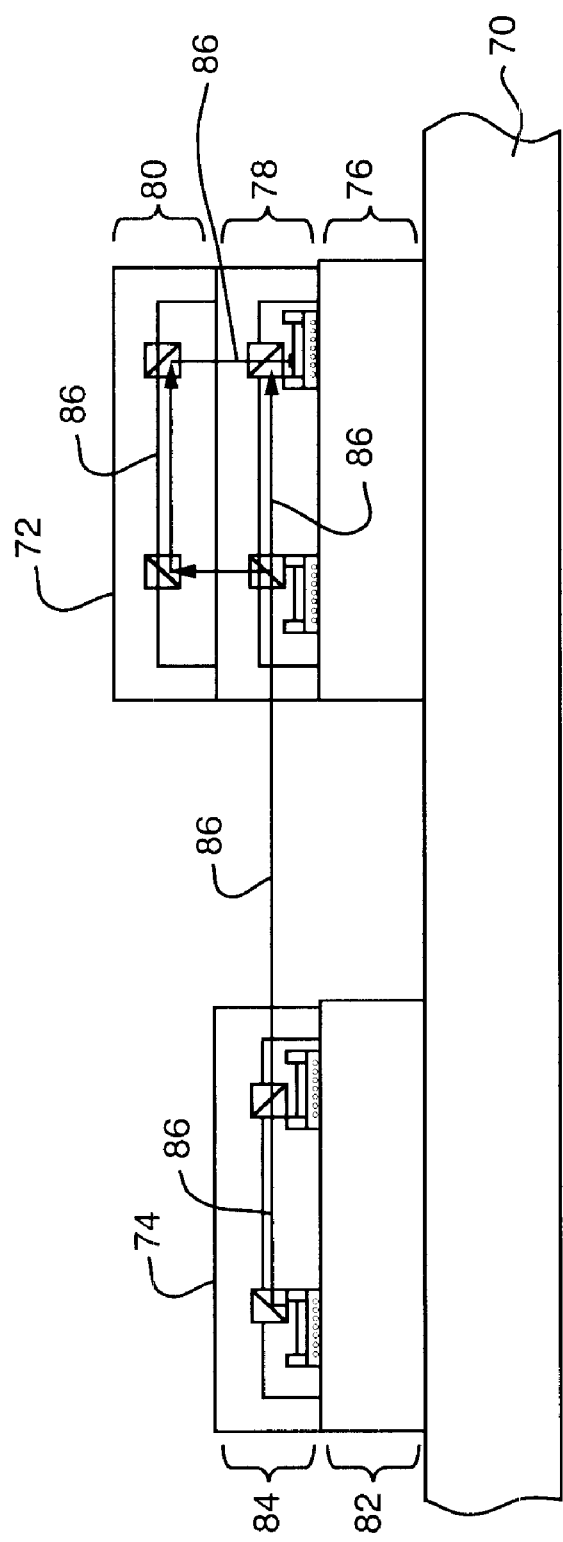
FIG. 5 is a schematic view of another embodiment according to this invention, in which optoelectronic devices with integrated optical elements are utilized for chip-to-chip optical communications.

Another embodiment of this invention is shown in FIG. 5. Circuit board 70 has optoelectronic chips 72 and 74 attached thereto. Chip 72 includes silicon substrate 76 with transceiver arrays attached thereto and passive optical element modules 78 and 80. Chip 74 includes silicon substrate 82 with transceiver arrays attached thereto and passive optical element module 84. This embodiment allows for optical communication and signal processing between different optoelectronic chips mounted on the same circuit board or within an enclosed module.

A large multiplicity of data channels may be connected between processing components, between processors and memory chips, between memory chips, and between any integrated circuit chips that require a high speed datalink or many high speed datalinks.

In yet another embodiment of this invention, a method for making an optoelectronic device with an integrated array of passive optical elements is provided, including the steps of: mounting a plurality of passive optical elements on a substrate; and hybridizing the array of passive optical elements with an array of active optical elements which are attached to a substrate containing driver and receiver circuitry, also known as a transceiver chip or assembly. The transceiver chip or assembly may have been made by a similar flip-chip process, i.e., a silicon, or other suitable, substrate with associated driver and receiver circuitry thereon is flip-chip bonded to one or more GaAs, InP, or other suitable, substrates upon which have been grown active optical elements, also known as photonic devices, such as laser transmitters and photo-diode receivers.

The passive optical elements of the present invention may be made of any suitable light transmitting, reflecting, diffusing or refracting material. For example, the passive optical elements may be made of glass, polymer or plastics.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An optoelectronic device, comprising:
    a first substrate with transceiver circuitry integrated thereon;
    at least one transceiver array electrically coupled to said transceiver circuitry, said transceiver array comprising a plurality of photonic devices;
    a plurality of passive optical elements proximal said at least one transceiver array and optically connecting said photonic devices; and
    a mold with said plurality of passive optical elements affixed to said mold, wherein said mold is coupled to said transceiver array, and wherein said passive optical elements are disposed between said transceiver array and said mold.

2. The optoelectronic device according to claim 1, wherein said photonic devices are a plurality of emitters and a plurality of receivers.

3. The optoelectronic device according to claim 2, wherein said emitters optically connect with said receivers on one said transceiver array.

4. The optoelectronic device according to claim 2, wherein said emitters of a first transceiver array optically connect with said receivers on a second transceiver array.

5. The optoelectronic device according to claim 2, wherein said emitters and receivers are arranged in an interdigitated pattern.

6. The optoelectronic device according to claim 1, further comprising slots in said mold for positioning said passive optical elements.

7. The optoelectronic device according to claim 6, wherein said mold with said passive optical elements is flip-chip bonded to said transceiver array.

8. The optoelectronic device according to claim 1, further comprising a second substrate with transceiver circuitry integrated thereon, and at least one transceiver array electrically coupled to said transceiver circuitry of said second substrates said transceiver array of said second substrate comprising a plurality of photonic devices, and wherein said photonic devices of said second substrate optically connect with said photonic devices of said first substrate.

9. The optoelectronic device according to claim 1, wherein said plurality of passive optical elements provide optical signal processing.

10. The optoelectronic device according to claim 1, wherein said plurality of passive optical elements arm selected from the group comprising modulators, mirrors, waveguides, beam splitters, beam combiners, prisms, gratings, holographic elements, wave division multiplexing elements, diffraction gratings, dispersion elements, microlenses and polarizing filters.

11. An optoelectronic device for optical communications, comprising:
    a first substrate with transceiver circuitry integrated thereon;
    at least one transceiver array electrically coupled to said transceiver circuitry, said transceiver array comprising a plurality of photonic devices;
    a plurality of passive optical elements proximal said transceiver array and optically connecting said photonic devices;

a first mold with at least one of said plurality of passive optical elements affixed to said first mold, wherein said first mold is coupled to said transceiver array, and wherein said at least one of said passive optical elements are disposed between said transceiver array and said first mold;

a second mold with at least one of said plurality of passive optical elements affixed to said second mold, wherein said second mold is coupled to said first mold, and wherein said at least one of said passive optical elements are disposed between said first mold and said second mold.

12. The optoelectronic device according to claim 11, wherein said photonic devices are a plurality of emitters and a plurality of receivers.

13. The optoelectronic device according to claim 12, wherein said emitters optically connect to said receivers on one said transceiver array.

14. The optoelectronic device according to claim 12, wherein said emitters of a first transceiver array communicate with said receivers on a second transceiver array.

15. The optoelectronic device according to claim 11, further comprising slots in said first and second mold for positioning said passive optical elements.

16. The optoelectronic device according to claim 11, wherein said first mold with said passive optical elements is flip-chip bonded to said transceiver array, and said second mold is flip-chip bond to said first mold.

17. The optoelectronic device according to claim 11, wherein said plurality of passive optical elements are selected from the group comprising modulators, mirrors, waveguides, beam splitters, beam combiners, prisms, gratings, holographic elements, wave division multiplexing elements, diffraction gratings, dispersion elements, microlenses and polarizing filters.

18. The optoelectronic device according to claim 11, further comprising a second substrate with transceiver circuitry integrated thereon, and at least one transceiver array electrically coupled to said transceiver circuitry of said second substrate, said transceiver array of said second substrate comprising a plurality of photonic devices, and wherein said photonic devices of said second substrate optically connect with said photonic devices of said first substrate.

19. A method for assembling an optoelectronic device with passive optical elements integrated thereon, comprising the steps of:

mounting a plurality of passive optical elements on a first mold to produce an array of passive optical elements;

fabricating a transceiver array including a plurality of photonic devices on a substrate, said substrate incorporating transceiver circuitry;

bonding said mold with said array of passive optical elements to said transceiver, wherein said plurality of optical elements are proximal said transceiver array.

20. The method for assembling according to claim 19, further comprising the steps of mounting a plurality of passive optical elements on a second mold to produce an array of passive optical elements on said second mold, and bonding said second mold with said array of passive optical elements to said first mold, wherein said plurality of optical elements of said second mold are proximal said passive optical elements of said first mole.

21. The method according to claim 19, wherein said fist mold is selected from the group of materials comprising: glass, quartz, epoxy, diamond thin films, and sapphire.

* * * * *

UNITED STATES PATENT AND TRADEMARK OFFICE
CERTIFICATE OF CORRECTION

PATENT NO. : 6,453,081 B1  Page 1 of 1
DATED : September 17, 2002
INVENTOR(S) : John A. Trezza and Glenn R. Thoren It is certified that error appears in the above-identified patent and that said Letters Patent is hereby corrected as shown below:

<u>Column 4,</u>
Line 44, delete "substrates", insert -- substrate --
Line 52, delete "arm," insert -- are --

<u>Column 5,</u>
Line 28, delete "bond", insert -- bonded --

<u>Column 6,</u>
Line 30, delete "mole", insert -- mold --

Signed and Sealed this

Fourth Day of November, 2003

JAMES E. ROGAN
*Director of the United States Patent and Trademark Office*